Oct. 14, 1958    D. H. BALLANTYNE ET AL    2,855,751
PUMP ARRANGEMENTS FOR GAS-TURBINE ENGINE FUEL SYSTEMS
Original Filed March 6, 1950
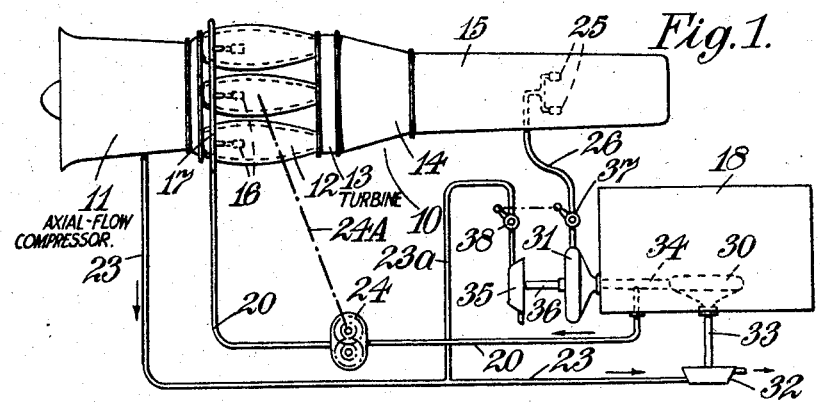
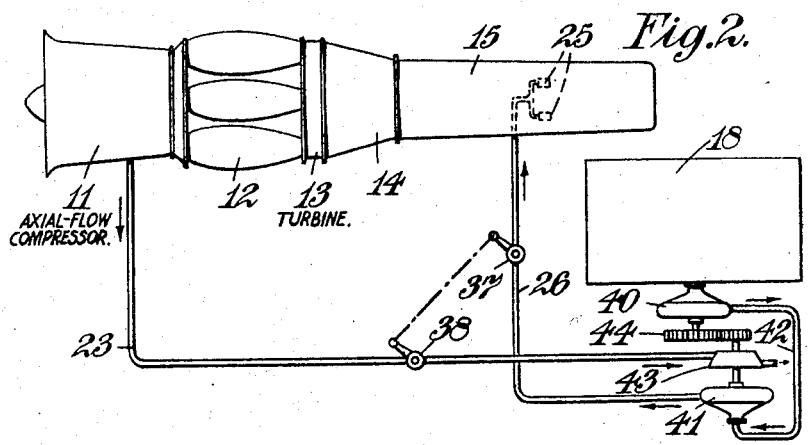
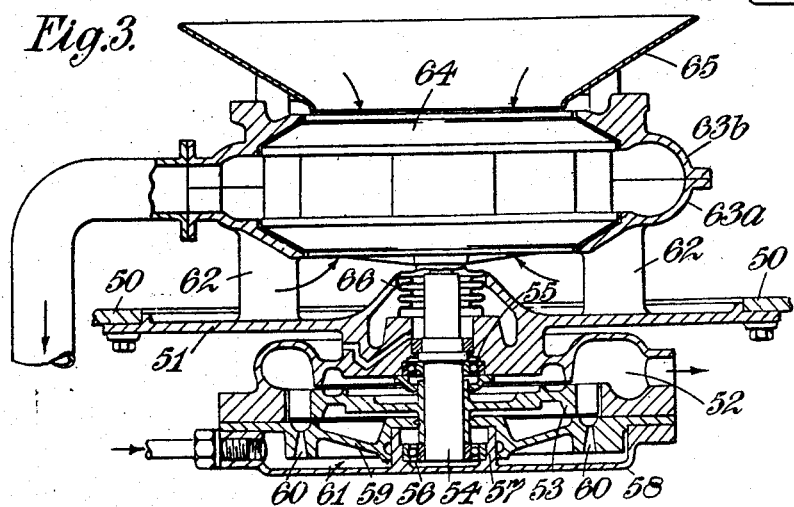
INVENTOR
DAVID H. BALLANTYNE ETAL
BY Mawhinney & Mawhinney, Attys

United States Patent Office 2,855,751
Patented Oct. 14, 1958

2,855,751

PUMP ARRANGEMENTS FOR GAS-TURBINE ENGINE FUEL SYSTEMS

David Havelock Ballantyne, Littleover, David Omri Davies, Derby, and Desmond Edward Bowns, Nottingham, England, assignors to Rolls-Royce Limited, Derby, Derby County, England, a British company Application October 26, 1953, Serial No. 388,374, now Patent No. 2,813,394, dated November 19, 1957, which is a division of application Serial No. 147,893, March 6, 1950, now Patent No. 2,706,888, dated April 26, 1955. Divided and this application July 23, 1957, Serial No. 677,416

Claims priority, application Great Britain March 10, 1949

1 Claim. (Cl. 60—35.6)

This application is a division of our copending application Serial No. 388,374, filed October 26, 1953, now Patent No. 2,813,394, which is itself a divisional application of our application Serial No. 147,893, now Patent No. 2,706,888, March 6, 1950.

The present invention relates to gas turbine power plant installations of the kind having a gas turbine engine comprising a compressor system, combustion equipment connected to receive air direct from said compressor system, a turbine connected to receive products of combustion direct from said combustion equipment, and reheat combustion equipment connected to the outlet of said turbine to heat the gas exhausted from the turbine and including reheat fuel injectors.

The object of the present invention is to provide a new fuel system for supplying fuel to the reheat fuel injectors.

One embodiment of the invention will now be described with reference to the accompanying drawings in which, Figure 1 illustrates diagrammatically one fuel system in accordance with the invention, set forth in our copending application Serial No. 388,374, now Patent No. 2,813,394, filed October 26, 1953.

Figure 2 illustrates diagrammatically another fuel system in accordance with the invention, and Figure 3 illustrates a form of air-motor-driven pump suitable for use in the arrangements of Figures 1 and 2.

Referring to Figure 1, there is illustrated a gas turbine engine 10 of the jet propulsion type suitable for use in aircraft. The engine comprises a compressor 11 illustrated as an axial-flow compressor, combustion equipment 12, illustrated as comprising a series of separate combustion chambers each containing a fuel injector 16, a turbine 13 and an exhaust assembly 14 leading to a jet pipe 15 in which reheat fuel injectors 25 are located. Air compressed by the compressor 11 is delivered to the combustion equipment 12 where it is heated by fuel injected through the fuel injectors 16. The products of combustion pass directly to the turbine 13 to drive it and then into the exhaust assembly 14 and jet pipe 15. The turbine drives the compressor by a shaft (not shown) extending centrally through the combustion equipment.

Fuel is delivered into the combustion equipment through the fuel injectors 16 from a manifold 17 which is supplied through a duct 20 from an engine-driven main fuel pump 24 which in this instance is illustrated as being a gear pump.

The drive to the pump 24 is indicated at 24a.

As is well known, the amount of fuel which can be burnt in the combustion equipment 12 is limited by considerations of the allowable temperature for the blades of the turbine 13.

This consideration does not affect the supply of fuel through the reheat fuel injectors 25 since they are downstream of the turbine and the parts with which gas heated by fuel injected through the reheat fuel injectors comes in contact are not highly stressed. It is therefore permissible for the exhaust gas to be at a much higher temperature than the products of combustion entering the turbine and so it is usual for a much larger flow of fuel to be injected through the reheat fuel injectors than is injected into the main combustion equipment.

For example, the maximum fuel supply by the main fuel system to the combustion equipment 12 may be of the order of 600 gallons per hour and this amount will normally be supplied whenever the reheat fuel system is operating. The reheat fuel system on the other hand may for example use approximately 1400 gallons per hour in an engine in which the maximum main fuel supply is 600 gallons per hour. Thus it will be appreciated that the fuel pump of the reheat fuel system has to deal with a much larger quantity of fuel than does the pump 24 of the main fuel system.

The reheat fuel system in the embodiment being described comprises a centrifugal pump 31 which supplies fuel through a pipe line 26 provided with a shut-off valve 37 to the reheat fuel injectors 25. This reheat fuel pump 31 is driven through a shaft 36 from an impulse air turbine 35. The air turbine 35 is supplied with compressed air through the ducts 23 and 23a from the compressor 11. The air supply to the air turbine 35 is controlled by an air control valve 38 which is operatively connected with the shut-off valve 37 so that fuel cannot be delivered to the reheat fuel injectors 25 except when the pump 31 is being driven by the air motor 35.

In order to deal with the large quantities of fuel (e. g. 1400 gallons per hour as mentioned above) which have to be supplied to the reheat fuel injectors 25, the pump 31 has to have a large capacity and it has been found that a centrifugal pump driven at high speed is eminently suitable.

In the embodiment being described, the pump 31 is driven at a speed of about 10,000 R. P. M.

Fuel is supplied to the inlet of both the pump 31 and the pump 24 by a booster pump 30 which is situated inside the fuel tank 18. The pump 30 delivers through a conduit 34 to the inlet of the pump 31 and a branch pipe 23 from the conduit 34 leads to the inlet of the pump 24.

The pump 30 may be driven in any convenient manner but it has to be appreciated that when the reheat fuel system is in operation and the main fuel pump 24 is delivering at its full capacity, the pump 30 will have to deal with a total of about 2,000 gallons per hour of fuel, though it does not have to discharge at a high pressure.

Any suitable pump to meet these requirements may be employed and it may be driven in any suitable manner. It has been found convenient to employ a centrifugal pump for the pump 30 mounted inside the fuel tank and to drive it from an air turbine 32 through a shaft 33. However the requirements for the pump 30 are such that it is preferable to use one with a larger impeller than that of the pump 31 and to drive it at a lower speed say, 1,000 R. P. M.

The air supply to the air turbine 32 is also taken from the compressor 11 through the pipe 23.

Referring to Figure 2, there is illustrated a reheat fuel supply system in accordance with the present invention for delivering fuel to the injectors 25 in the jet pipe 15 of a gas turbine engine.

The engine is the same as the engine shown in Figure 1 except as regards its fuel system, but for the sake of clarity the fuel supply system to the burners in the main combustion equipment 12 has been omitted.

The fuel system to the reheat burners shown in Figure 2 comprises two centrifugal pumps 40 and 41 connected hydraulically in series by the pipe 42. The two pumps 40 and 41 are both driven by air impulse turbine 43. This turbine is connected directly to the impeller of the pump 41 but is connected to the impeller of the pump 40 through a speed reduction gearing so that the impeller of the pump 40 rotates at a lower speed than that of the pump 41.

Pump 40 is a booster pump which takes fuel from the tank 18 and supplies it to the inlet of the pump 41. The pump 41 is the main pump of the fuel supply system and is connected to the reheat fuel injectors 25 through duct 26 provided with a shut-off valve 37 as in the previous embodiment.

The air supply to the turbine 43 is taken from the compressor 11 through the duct 23 and is controlled by an air control valve 38 which is operatively interconnected with the shut-off valve 37.

One suitable construction of centrifugal pump and air turbine to drive it is shown in Figure 3, the pump being located inside the wall of the fuel tank.

In this figure, the wall of the fuel tank is indicated at 50 and an aperture is provided therein which is closed by a plate 51. The plate 51 has formed on its outer surface and integral with it, an exhaust scroll 52 of an air impulse turbine, the rotor disc 53 of which is carried on a shaft 54 mounted in bearings 55 accommodated centrally of the scroll 52 and in bearings 56 housed in an internal hollow boss 57 on a cover plate 58 of the turbine.

A plate 59 formed with a series of nozzles 60 is located between the cover plate 58 and the rotor disc 53. The space 61 between the plate 59 and the cover plate 58 forms an air distribution chamber for the nozzles 60.

Mounted on the inner surface of the plate 51 by means of standards 62, there is one part 63a of the casing of a double-entry centrifugal pump, the impeller 64 of which is of the shrouded type. The other part 63b of the casing is secured to the part 63a and carries a conical member 65 forming the inlet to the upper eye of the impeller.

The impeller 64 is secured to an extension of the shaft 54 of the turbine rotor disc 53 to rotate therewith. A flexible metal bellows-type legging 66 is located in a cavity in the plate 51 and is secured at its lower end to the plate. The upper end of the legging 66 carries a washer member bearing on the hub of the impeller 64. The legging 66 acts to prevent leakage of fuel along the shaft 54.

We claim:

In a gas turbine power plant installation having a gas turbine engine comprising a compressor system, combustion equipment connected to receive air direct from said compressor system, a turbine connected to receive products of combustion direct from said combustion equipment, and reheat combustion equipment connected to the outlet of said turbine to heat the gas exhausted from the turbine and including reheat fuel injectors, a fuel system for supplying fuel to said reheat fuel injectors comprising a high-speed centrifugal pump having an inlet and an outlet, a delivery pipeline connected between the outlet of said pump and said reheat fuel injectors, a fuel tank located remotely from the engine, a booster pump of large capacity compared with said high speed centrifugal pump, said booster pump having an inlet in direct communication with said tank to draw fuel therefrom and having an outlet, a connection from the outlet of said booster pump to the inlet of said high-speed pump, a high-speed air turbine, an air duct between said compressor system and said high speed air turbine to supply compressed air to said high speed air turbine, a direct drive connection between said high speed air turbine and said high-speed centrifugal pump, and a drive connection including reduction gearing between said high-speed air turbine and the booster pump, whereby the booster pump is driven at a lower rotational speed than the high-speed centrifugal pump.

No references cited.